United States Patent
Wang (10) Patent No.: US 11,838,438 B2
(45) Date of Patent: Dec. 5, 2023

(54) MESSAGE VIEWING METHOD AND TERMINAL

(71) Applicant: VIVO MOBILE COMMUNICATION CO., LTD., Dongguan (CN)

(72) Inventor: Fei Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/726,512

(22) Filed: Apr. 21, 2022

(65) Prior Publication Data

US 2022/0244819 A1 Aug. 4, 2022

Related U.S. Application Data

(63) Continuation of application No. PCT/CN2020/123134, filed on Oct. 23, 2020.

(30) Foreign Application Priority Data

Oct. 28, 2019 (CN) .......................... 201911032072.3

(51) Int. Cl.
*H04M 1/7243* (2021.01)
*G06F 3/0482* (2013.01)
*G06F 3/0483* (2013.01)
(Continued)

(52) U.S. Cl.
CPC ........ *H04M 1/7243* (2021.01); *G06F 3/0482* (2013.01); *G06F 3/0483* (2013.01); *H04L 51/216* (2022.05); *H04L 51/56* (2022.05)

(58) Field of Classification Search
CPC .. G06F 3/0483; G06F 3/0482; G06F 3/04817; G06F 3/0484; H04M 1/7243;
(Continued)

(56) References Cited

U.S. PATENT DOCUMENTS 9,483,529 B1 * 11/2016 Pasoi ...................... H04L 51/52
9,913,114 B1 * 3/2018 Wu .......................... G06T 11/60
(Continued)

FOREIGN PATENT DOCUMENTS

CN 104322040 A 1/2015
CN 105094683 A 11/2015
(Continued)

OTHER PUBLICATIONS

International Search Report issued in corresponding International Application No. PCT/CN2020/123134, dated Jan. 25, 2021, 6 pages.
(Continued)

*Primary Examiner* — Nicholas Ulrich
(74) *Attorney, Agent, or Firm* — IPX PLLC (57) ABSTRACT

The present disclosure provides a message viewing method and a terminal, where the method includes: receiving a first input; and in response to the first input, displaying a message display screen, where in a case that there is an unread message of at least one application, the message display screen includes at least one display window, or if there is no unread message, the message display screen does not include the display window; and each of the display window(s) is used to display at least part of unread messages of one application.

18 Claims, 8 Drawing Sheets

(51) Int. Cl.
*H04L 51/216* (2022.01)
*H04L 51/56* (2022.01)

(58) Field of Classification Search
CPC ............. H04M 1/72469; H04L 51/224; H04L 51/216; H04L 51/56; H04L 51/42; H04L 51/04
See application file for complete search history.

(56) References Cited

U.S. PATENT DOCUMENTS

| | | | |
|---|---|---|---|
| 10,243,893 B2* | 3/2019 | Park | ................. H04L 51/52 |
| 2013/0125062 A1 | 5/2013 | Lee et al. | |
| 2014/0149919 A1 | 5/2014 | Larson et al. | |
| 2015/0012855 A1* | 1/2015 | Won | ................. G06F 3/04883 |
| | | | 715/765 |

FOREIGN PATENT DOCUMENTS

| | | |
|---|---|---|
| CN | 105426082 A | 3/2016 |
| CN | 105760041 A | 7/2016 |
| CN | 107015719 A | 8/2017 |
| CN | 107272996 A | 10/2017 |
| CN | 107977132 A | 5/2018 |
| CN | 107992248 A | 5/2018 |
| CN | 110837327 A | 2/2020 |
| EP | 2706446 A1 | 3/2014 |
| WO | 2019051836 A1 | 3/2019 |

OTHER PUBLICATIONS

First Office Action issued in related Chinese Application No. 201911032072.3, dated Sep. 14, 2020, 9 pages.

* cited by examiner

MESSAGE VIEWING METHOD AND TERMINAL

CROSS-REFERENCE TO RELATED APPLICATIONS

This application is a continuation of International Application No. PCT/CN2020/123134, filed Oct. 23, 2020, which claims priority to Chinese Patent Application No. 201911032072.3, filed Oct. 28, 2019. The entire contents of each of the above-referenced applications are expressly incorporated herein by reference.

TECHNICAL FIELD

Embodiments of the present disclosure relate to the field of terminal technologies, and in particular, to a message viewing method and a terminal.

BACKGROUND

With rapid development of the mobile Internet, smart phones have become inseparable mobile devices in our daily life, and abundant applications (APP) on mobile phones can meet our various needs. Now, nearly all applications on smart phones push some messages to users, for example, social applications will push messages from other users, and shopping applications will push messages about sales promotions. With increasing improvement of performance, more and more applications are installed by users. When viewing messages, users need to start the applications one by one to confirm whether there are new unread messages and read the messages. Even with an alert function for unread messages (for example, a red dot or a number of messages is displayed at icons of the applications), if the icons of the applications are distributed on multiple pages, the users also need to perform multiple flipping operations to confirm whether there are unread messages of the applications. To sum up, the current operation for viewing messages is relatively complex, which affects user experience.

SUMMARY

Embodiments of the present disclosure provide a message viewing method and a terminal, to resolve the problem that an existing message viewing manner is relatively complex.

To resolve the foregoing technical problem, the present disclosure is implemented as follows:

According to a first aspect, an embodiment of the present disclosure provides a message viewing method, including:
  receiving a first input; and
  in response to the first input, displaying a message display screen, where in a case that there is an unread message of at least one application, the message display screen includes at least one display window, or if there is no unread message, the message display screen does not include the display window; and
  each of the display window(s) is used to display at least part of unread messages of one application.

According to a second aspect, an embodiment of the present disclosure further provides a terminal, including:
  a first receiving module, configured to receive a first input; and
  a message display module, configured to: in response to the first input, display a message display screen, where in a case that there is an unread message of at least one application, the message display screen includes at least one display window, or if there is no unread message, the message display screen does not include the display window; and
  each of the display window(s) is used to display at least part of unread messages of one application.

According to a third aspect, an embodiment of the present disclosure further provides a terminal, including: a processor, a memory, and a computer program stored in the memory and capable of running on the processor, and when the computer program is executed by the processor, the steps of the foregoing message viewing method are implemented.

According to a fourth aspect, an embodiment of the present disclosure further provides a computer readable storage medium, where the computer readable storage medium stores a computer program, and when the computer program is executed by a processor, the steps of the foregoing message viewing method are implemented.

In the embodiments of the present disclosure, unread messages of a plurality of different applications can be displayed on one message display screen. Therefore, when viewing an unread message of an application, a user does not need to start the corresponding application, and after viewing the unread message of the current application, the user does not need to exit from a screen of the current application, find an icon of another application on the desktop, and tap on that icon to start another application. This facilitates the speed of message viewing and makes operations simpler and more convenient, thereby greatly improving user experience in message viewing. In addition, if there is no unread message currently, the message display screen does not include any display window, so the user does not need to check applications one by one for unread messages.

DETAILED DESCRIPTION

To make the objectives, technical solutions, and advantages of embodiments of the present disclosure clearer, the following clearly describes the technical solutions of the embodiments of the present disclosure with reference to drawings of the embodiments of the present disclosure. Apparently, the described embodiments are some rather than all embodiments of the present disclosure. All other embodiments that a person of ordinary skill in the art obtains based on the embodiments of the present disclosure shall fall within the protection scope of the present disclosure.

Figure 1:
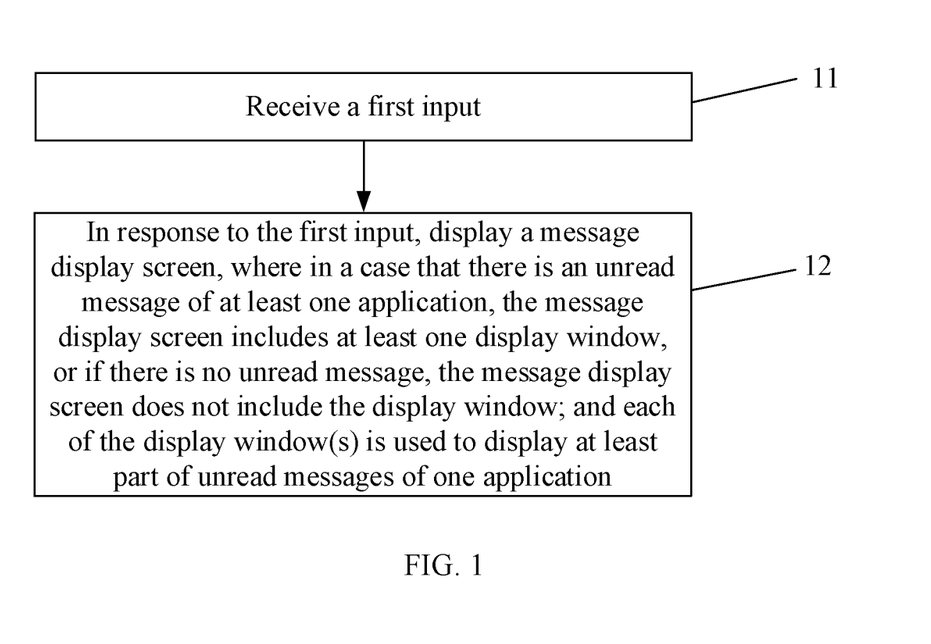
FIG. 1 is a schematic flowchart of a message viewing method according to Embodiment 1 of the present disclosure.

Referring to FIG. 1, FIG. 1 is a schematic flowchart of a message viewing method provided in Embodiment 1 of the present disclosure. The method is applied to a terminal and includes:

Step 11. Receive a first input, where the first input is used to invoke a message display screen.

Figure 2:
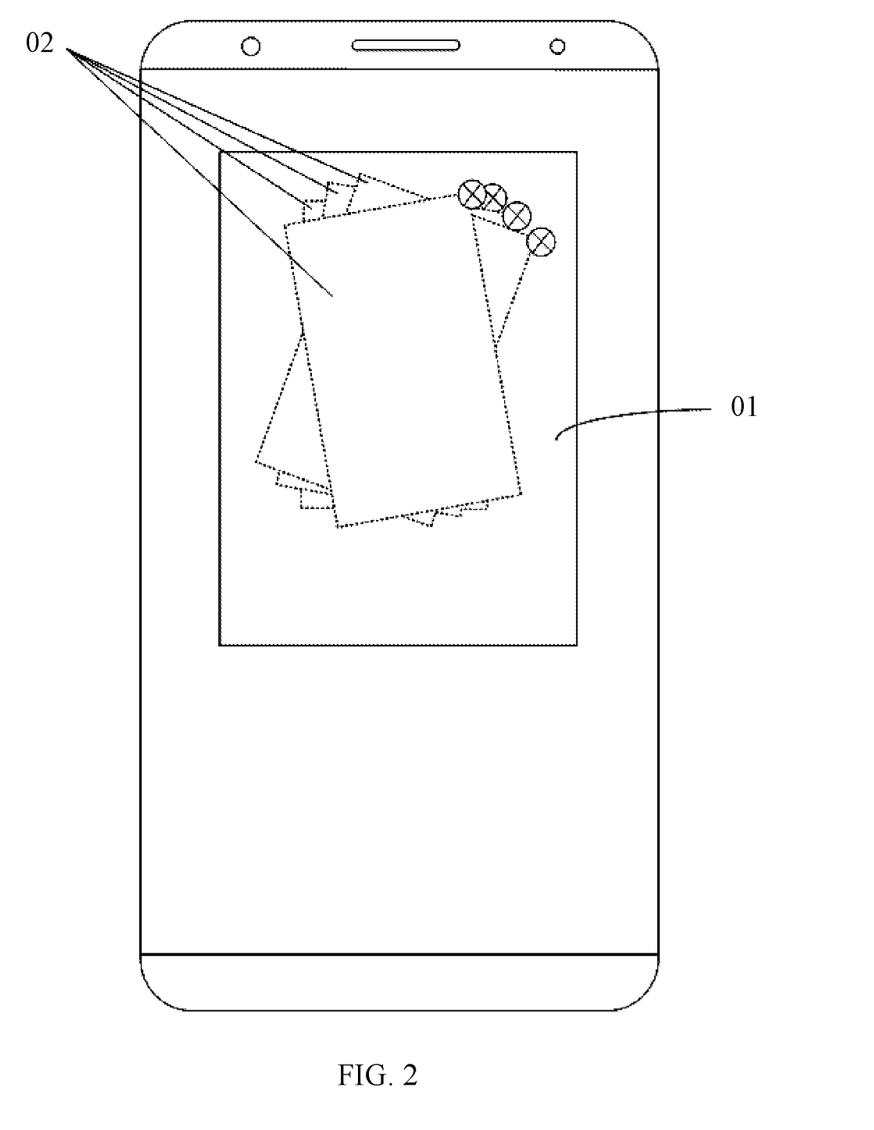
FIG. 2 is a schematic diagram of a message display screen.

Step 12. In response to the first input, display a message display screen 01. Referring to FIG. 2, in a case that there is an unread message of at least one application, the message display screen 01 includes at least one display window 02, or if there is no unread message, the message display screen 01 does not include the display window; and each of the display window(s) 02 is used to display at least part of unread messages of one application.

In this embodiment of the present disclosure, the display window 02 may specifically be a display window in a message card format. In a silent state, the message display screen 01 is hidden at an edge of a terminal screen.

It should be noted that, if there is an unread message of only one application, the message display screen 01 may display only one display window 02; and if there is no unread message of any application, the message display screen 01 may not display the display window 02. That is, a quantity of display windows 02 in the message display screen 01 is determined by a quantity of applications with unread messages.

In the related art, to view an unread message, a user needs to tap on an icon of an application to start the application, and tap to display the unread message. If the user wants to view an unread message of another application after viewing all unread messages of one application, the user needs to exit from a screen of the current application, find an icon of another application by switching to desktop, tap on that icon to start another application, and tap to display the unread message. The operations are relatively complex. In particular, when the user needs to view unread messages of a plurality of applications, the repeated and complex operations greatly deteriorate user experience. In addition, when determining whether there are still unread messages, the user still needs to view icons of applications one by one even if an alert function for unread messages is present.

According to the message viewing method provided in this embodiment of the present disclosure, unread messages of a plurality of different applications can be displayed on one message display screen 01. Therefore, when viewing an unread message of an application, the user does not need to start the corresponding application, and after viewing the unread message of the current application, the user does not need to exit from a screen of the current application, find an icon of another application on desktop, and tap on that icon to start another application. This facilitates the speed of message viewing and makes operations simpler and more convenient, thereby greatly improving user experience in message viewing. In addition, if there is no unread message currently, the message display screen 01 does not include any display window, so the user does not need to check applications one by one for unread messages.

The following describes the message viewing method by using examples.

The first input may be an input of two successive taps on the terminal screen in preset duration, that is, a double-tap input. Certainly, the first input is not limited to a double-tap input, but may alternatively be other inputs, which is not limited herein. Further, the first input is a double-tap input for desktop of the terminal. That means only a double-tap input received when the terminal screen is displaying the desktop interface can serve as the first input to invoke a message display screen.

Figure 3:
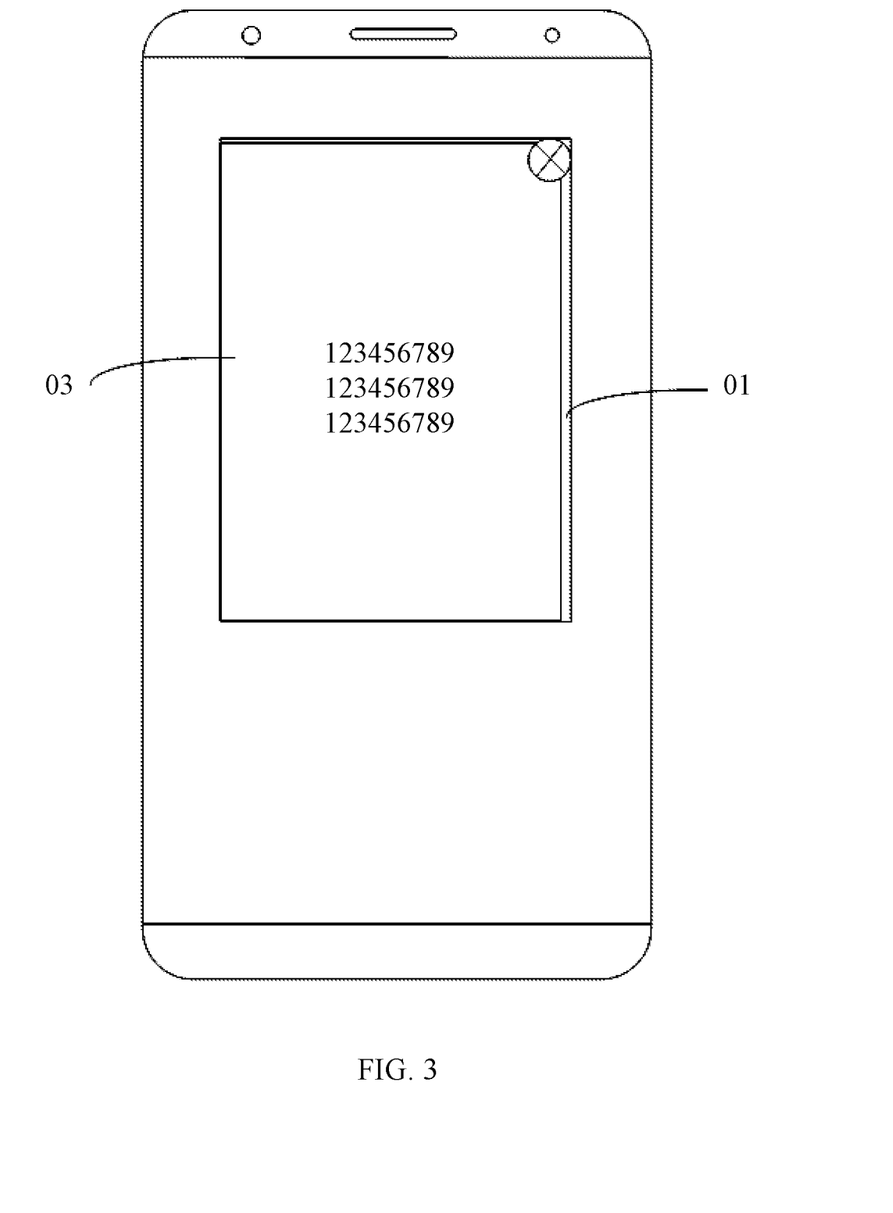
FIG. 3 is a schematic diagram of a message details screen.

In an optional specific implementation, after the step of displaying a message display screen, the method further includes:

receiving a second input for a first display window, where the first display window is one of the at least one display window 02; and in response to the second input, as shown in FIG. 3, displaying, on the message display screen 01, a message details screen 03 corresponding to the first display window, where the message details screen 03 is used to display all unread messages of an application corresponding to the first display window.

In this embodiment of the present disclosure, the display window 02 may be used to display unread message(s) of one application. However, in a case that the application has many unread messages, the display window 02 may not be able to display all the unread messages. Therefore, to view all the unread messages, the user needs to input a second input to make the terminal switch to the message details screen 03.

Further, after the step of displaying, on the message display screen in response to the second input, a message details screen corresponding to the first display window, the method further includes:

receiving a fourth input by a user; and in response to the fourth input, updating a message currently displayed on the message details screen 03.

Specifically, unread messages currently not displayed may be displayed on the message details screen 03 in response to the fourth input. The fourth input can be a flick input.

That is, if the message details screen 03 is also not able to display all the unread messages of the application, scroll display or page flipping for the messages can be implemented through flicking.

The message details screen 03 is further used to display a read historical message of the application corresponding to the first display window.

In this embodiment of the present disclosure, not only an unread message but also a read historical message of an application can be viewed on the message display screen 01, further facilitating the ease of message viewing for the user and improving user experience.

In addition, in the step of updating, in response to the fourth input, a message currently displayed on the message details screen 03, messages displayed on the message details screen 03 after the updating can include the read historical message. That is, the user can achieve scroll display or page flipping for unread and read messages through flicking.

In this embodiment of the present disclosure, a plurality of display windows 02 can be displayed by tiling on the message display screen 01, so the user can view unread messages in each of the display window(s) 02 after invoking the message display screen 01.

In addition, referring to FIG. 2, the plurality of display windows 02 can also be displayed in a stacked manner on the message display screen 01 in order to display as many unread messages as possible. For the display windows 02 displayed in a stacked manner, the user can view an unread message displayed in the topmost display window 02 directly, but to view an unread message displayed in the display window 02 located at a lower layer, the user needs to switch the display window 02 located at the lower layer to the topmost layer. Details are described as follows.

In a case that the message display screen 01 includes at least two display windows 02, after the step of displaying a message display screen, the method further includes:

receiving a third input; and in response to the third input, switching a second display window displayed at a topmost layer of the message display screen to a third display window, where the second display window and the third display window are two different display windows of the at least two display windows.

Figure 4:
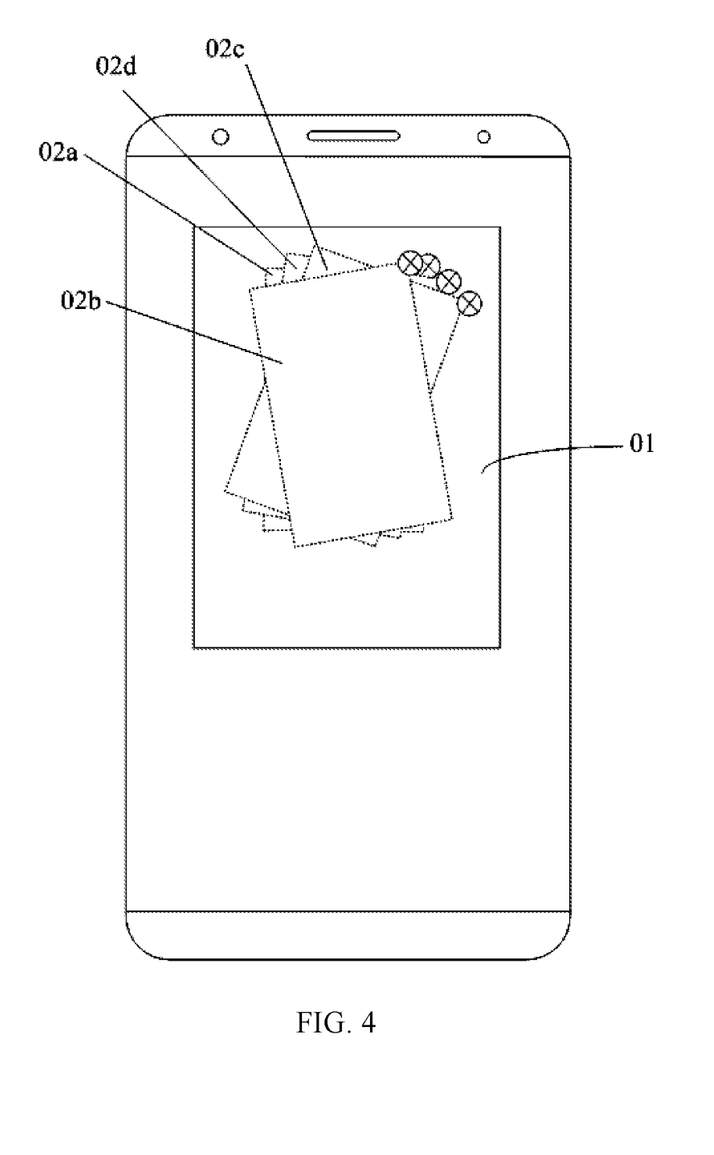
FIG. 4 is a schematic diagram of a message display screen before switching a display window.
Figure 5:
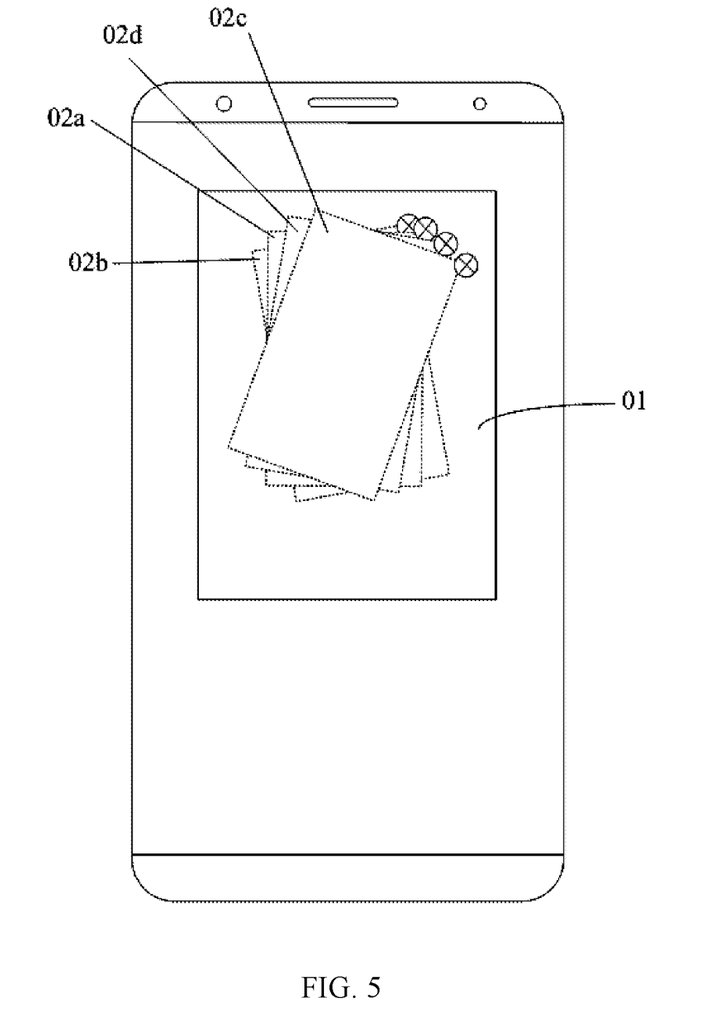
FIG. 5 is a schematic diagram of a message display screen after switching a display window.

For example, referring to FIG. 4 and FIG. 5, in a case that the message display screen 01 includes four display windows: 02a, 02b, 02c, and 02d, a third input is received, and in response to the third input, the third display window 02c previously located below the second display window 02b in the message display screen 01 is switched to the topmost layer, where the second display window 02b and the third display window 02c are two different display windows of the at least two display windows. Specifically, for the message display screen 01 before switching, refer to FIG. 4, and for the message display screen 01 after switching, refer to FIG. 5.

In this embodiment of the present disclosure, the user can view unread messages of a plurality of different applications in the message display screen 01 by switching display of each display window 02 through the third input. This features simpler operations compared with the current method for viewing unread messages of the plurality of different applications (exit from a current screen, find an icon of another application by switching to desktop, tap on that icon to start the another application, and tap to display the unread messages).

In addition, the user can also double-tap to close the message display screen 01 after viewing desired messages. That is, after the step of displaying a message display screen, the method further includes:

receiving a fifth input; and in response to the fifth input, controlling to close the message display screen 01.

The fifth input is a double-tap input. Further, the fifth input is a double-tap input of tapping on a position of the screen displaying the desktop interface.

In some optional specific implementations, the at least two display windows are arranged in order, the second display window and the third display window are two adjacent display windows of the at least two display windows, and the third input is a flicking input. That is, each time one flicking input is received, in response to the flicking input, a display window adjacent to a display window currently displayed on the topmost layer is displayed on the topmost layer.

That is, the user can switch to display different display windows 02 through flicking to view unread messages of different applications, which features simple, convenient, and quick operations.

Figure 6:
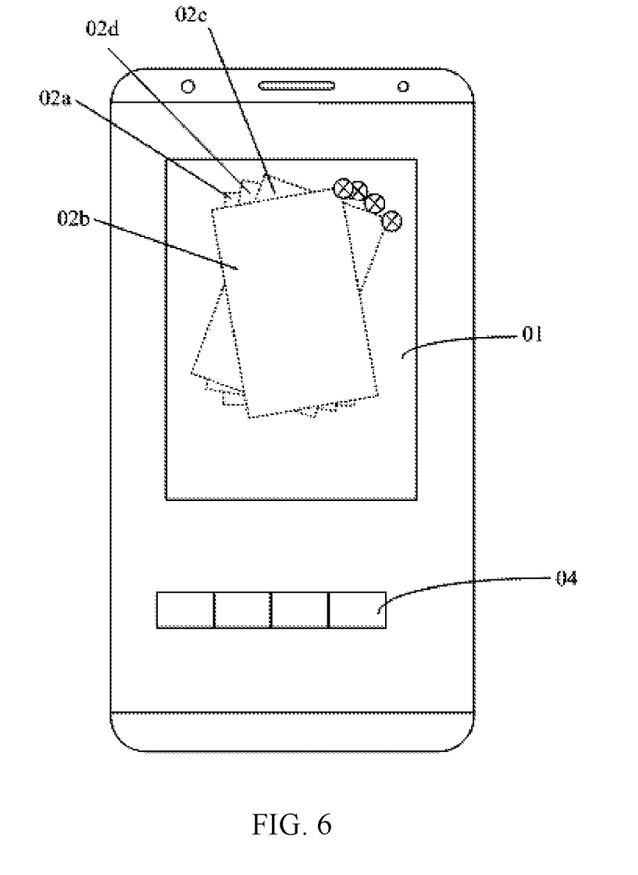
FIG. 6 is a schematic diagram of a message display screen including an operation control list.

In some other optional specific implementations, as shown in FIG. 6, the message display screen 01 further displays an operation control list 04, and operation controls in the operation control list 04 are in one-to-one correspondence to all display windows 02 (such as 02a, 02b, 02c, and 02d) currently included in the message display screen 01; and the third input is an input for an operation control corresponding to the third display window 02c.

In this embodiment of the present disclosure, the third input is just used to switch to display the display windows 02. When a display window 02 displayed on the topmost layer is switched to a lower layer, the display window 02 is not closed, that is, the display window 02 that has been switched to the lower layer may further be switched back to the topmost layer by the third input. Therefore, to implement a function of closing the display window 02, a close button may be provided in the display window 02, so that the user can close the display window 02 by tapping on the close button. The user can close part of the display windows 02 or close all the display windows 02 by using the close buttons in the display windows 02.

In addition, when the display window 02 is closed, if the application corresponding to the display window 02 receives a new message, the display window 02 is invoked again.

The unread message of the application is obtained based on a quick application framework. That is, message data of an application can be rendered by using a quick application as a basic render unit and using a message card as a display format, so that the user can quickly view messages without starting the application.

The quick application is a type of application. Such an application is tap-and-play, so the user does not need to download or run an installation package, but still experiences the performance of a native application.

In a current manner for viewing an unread message of an application, the application needs to be started, and the started application occupies memory resources of the terminal. Especially when the user needs to view unread messages of a plurality of applications, the plurality of started applications occupy a lot of memory resources of the terminal, and increase burdens of the terminal system, resulting in slow response or freezing of the terminal. Therefore, according to the message viewing method provided in this embodiment of the present disclosure, unread messages of applications are rendered to the display windows 02 on the message display screen 01 based on the quick application framework, thereby reducing terminal resources consumption and system burdens when the user views messages.

Specifically, during the rendering of messages, the unread messages of each application can be rendered to a corresponding display window 02 by using a unique identification information of the applications. That is, the applications may be mapped to the display windows 02 by using the unique identification information of the applications.

In addition, when the message details screen 03 is further used to display a historical message of the corresponding application, the historical message is also rendered to the message details screen based on the quick application framework.

Figure 7:
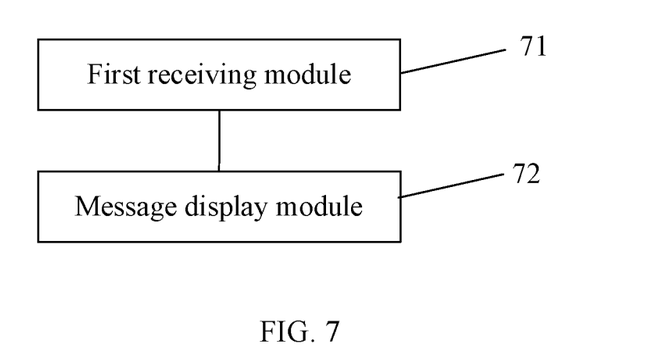
FIG. 7 is a schematic structural diagram of a terminal according to Embodiment 2 of the present disclosure.

FIG. 7 is a schematic structural diagram of a terminal provided in Embodiment 2 of the present disclosure. The terminal includes:

a first receiving module 71, configured to receive a first input; and a message display module 72, configured to: in response to the first input, display a message display screen, where in a case that there is an unread message of at least one application, the message display screen includes at least one display window, or if there is no unread message, the message display screen does not include the display window; and each of the display window(s) is used to display at least part of unread messages of one application.

The terminal provided in this embodiment of the present disclosure can display unread messages of a plurality of different applications on one message display screen. Therefore, when viewing an unread message of an application, a user does not need to start the corresponding application, and after viewing the unread message of the current application, the user does not need to exit from a screen of the current application, find an icon of another application on desktop, and tap on that icon to start the another application. This facilitates the speed of message viewing and makes operations simpler and more convenient, thereby greatly improving user experience in message viewing. In addition, if there is no unread message currently, the message display screen 01 does not include any display window, so that the user does not need to check applications one by one for unread messages.

The following describes the terminal by using examples.

In some embodiments, the terminal further includes:
a second receiving module, configured to receive a second input for a first display window, where the first display window is one of the at least one display window; and
a message details display module, configured to, in response to the second input, display, on the message display screen, a message details screen corresponding to the first display window, where the message details screen is used to display all unread messages of an application corresponding to the first display window.

The message details screen is further used to display a read historical message of the application corresponding to the first display window.

In some embodiments, the terminal further includes:
a third receiving module, configured to receive a third input in a case that the message display screen includes at least two display windows; and
a switching module, configured to switch a second display window displayed at a topmost layer of the message display screen to a third display window, where the second display window and the third display window are two different display windows of the at least two display windows.

The message display screen further displays an operation control list, and operation controls in the operation control list are in one-to-one correspondence to all display windows currently included in the message display screen; and
the third input is an input for an operation control corresponding to the third display window.

In some embodiments, the unread message of the application is obtained based on a quick application framework.

The processes in the foregoing Embodiment 1 of method can be implemented on the terminal provided in this embodiment of the present disclosure. To avoid repetition, details are not further described herein.

Figure 8:
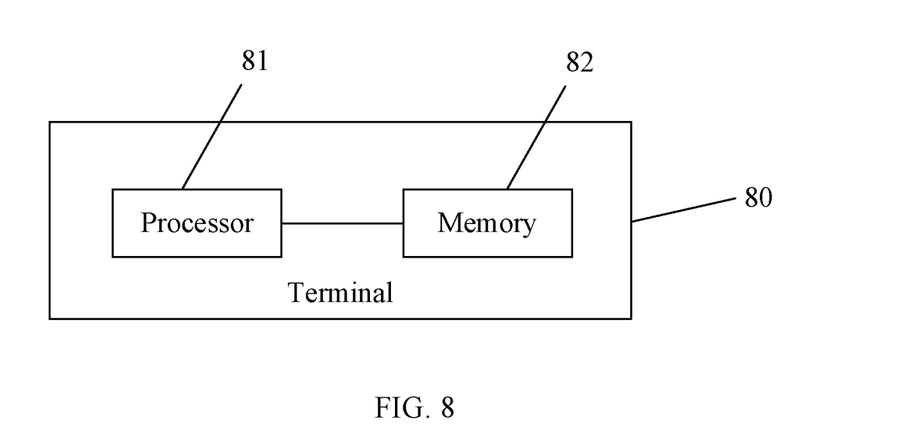
FIG. 8 is a schematic structural diagram of a terminal according to Embodiment 3 of the present disclosure.

FIG. 8 is a schematic structural diagram of a terminal provided in Embodiment 3 of the present disclosure. The terminal 80 includes a processor 81, a memory 82, and a computer program stored in the memory 82 and capable of running on the processor 81, and when the computer program is executed by the processor 81, the following steps are implemented:
receiving a first input; and
in response to the first input, displaying a message display screen, where in a case that there is an unread message of at least one application, the message display screen includes at least one display window, or if there is no unread message, the message display screen does not include the display window; and
each of the display window(s) is used to display at least part of unread messages of one application.

The terminal provided in this embodiment of the present disclosure can display unread messages of a plurality of different applications on one message display screen. There-
fore, when viewing an unread message of an application, a user does not need to start the corresponding application, and after viewing the unread message of the current application, the user does not need to exit from a screen of the current application, find an icon of another application on desktop, and tap on that icon to start the another application. This facilitates the speed of message viewing and makes operations simpler and more convenient, thereby greatly improving user experience in message viewing. In addition, if there is no unread message currently, the message display screen 01 does not include any display window, so that the user does not need to check applications one by one for unread messages.

In some embodiments, when the computer program is executed by the processor 81, the following steps are further implemented:
after the step of displaying a message display screen, further
receiving a second input for a first display window, where the first display window is one of the at least one display window; and
in response to the second input, displaying, on the message display screen, a message details screen corresponding to the first display window, where the message details screen is used to display all unread messages of an application corresponding to the first display window.

The message details screen is further used to display a read historical message of the application corresponding to the first display window.

When the computer program is executed by the processor 81, the following steps are further implemented:
in a case that the message display screen includes at least two display windows, after the step of displaying a message display screen, further
receiving a third input; and
in response to the third input, switching a second display window displayed at a topmost layer of the message display screen to a third display window, where the second display window and the third display window are two different display windows of the at least two display windows.

In some embodiments, the message display screen further displays an operation control list, and operation controls in the operation control list are in one-to-one correspondence to all display windows currently included in the message display screen; and
the third input is an input for an operation control corresponding to the third display window.

In some embodiments, the unread message of the application is obtained based on a quick application framework.

The processes in the foregoing embodiment of method can be implemented by the terminal with the same technical effects achieved. To avoid repetition, details are not further described herein.

Figure 9:
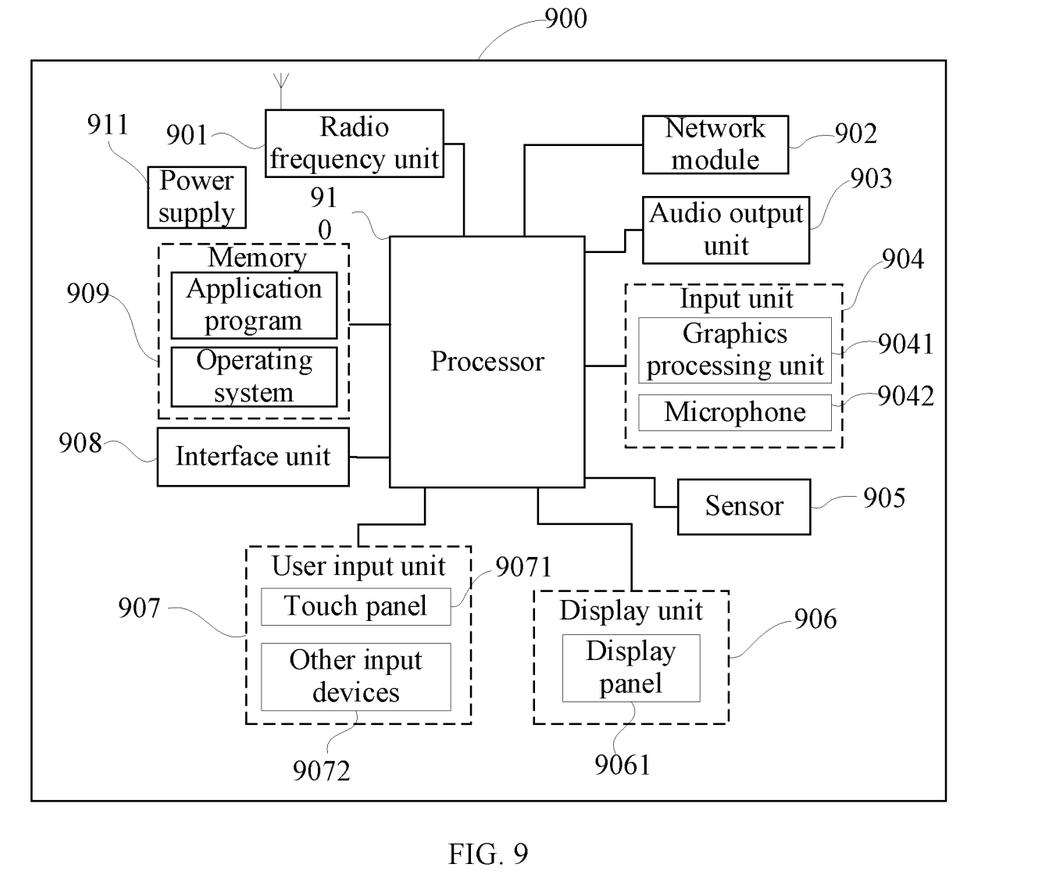
FIG. 9 is a schematic structural diagram of hardware of a terminal implementing the embodiments of the present disclosure.

FIG. 9 is a schematic structural diagram of hardware of a terminal implementing the embodiments of the present disclosure. The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the terminal structure displayed in FIG. 9 does not constitute any limitation on the terminal, which can include more or fewer components than displayed in the drawing, or combine some components, or have different component arrangements. In this embodiment of the present disclosure, the terminal includes but is not limited to: a mobile phone, a tablet computer, a notebook computer, a palmtop computer, an in-vehicle terminal, a wearable device, a pedometer, and the like.

The processor 910 is configured to: receive a first input; and in response to the first input, display a message display screen, where in a case that there is an unread message of at least one application, the message display screen includes at least one display window, or if there is no unread message, the message display screen does not include the display window; and each of the display window(s) is used to display at least part of unread messages of one application.

In this embodiment of the present disclosure, unread messages of a plurality of different applications can be displayed on one message display screen. Therefore, when viewing an unread message of an application, a user does not need to start the corresponding application, and after viewing the unread message of the current application, the user does not need to exit from a screen of the current application, find an icon of another application on desktop, and tap on that icon to start the another application. This facilitates the speed of message viewing and makes operations simpler and more convenient, thereby greatly improving user experience in message viewing. In addition, if there is no unread message currently, the message display screen 01 does not include any display window, so that the user does not need to check applications one by one for unread messages.

It should be understood that, in this embodiment of the present disclosure, the radio frequency unit 901 can be configured to receive and send signals during an information transmission/reception or call process. Specifically, the radio frequency unit 901 receives downlink data from a base station and sends the downlink data to the processor 910 for processing; and sends uplink data to the base station. Generally, the radio frequency unit 901 includes but is not limited to: an antenna, at least one amplifier, a transceiver, a coupler, a low noise amplifier, a duplexer, and the like. In addition, the radio frequency unit 901 may also communicate with a network and other devices through a wireless communication system.

The terminal provides wireless broadband internet access for a user through the network module 902, for example, helping the user send and receive emails, browse web pages, and access streaming media.

The audio output unit 903 may convert audio data received by the radio frequency unit 901 or the network module 902, or stored in the memory 909, to audio signals and output the signals as sound. Besides, the audio output unit 903 may also provide an audio output related to specific functions executed by the terminal 900 (for example, call signal received sound and message received sound). The audio output unit 903 includes a speaker, a buzzer, a phone receiver, and the like.

The input unit 904 is configured to receive an audio or a video signal. The input unit 904 may include: a graphics processing unit (GPU) 9041 and a microphone 9042, where the graphics processing unit 9041 processes image data of a static picture or video obtained by an image capture device (such as a camera) in an image capture mode or video capture mode. A processed image frame may be displayed on the display unit 906. The image frame processed by the graphics processing unit 9041 may be stored in the memory 909 (or another storage medium) or transmitted by the radio frequency unit 901 or the network module 902. The microphone 9042 may receive sound, and process such sound to audio data. The processed audio data may be output after being converted, under a phone call mode, to a format that can be sent to a mobile communication base station by the radio frequency unit 901.

The terminal 900 further includes at least one type of sensor 905, for example, an optical sensor, a motion sensor, and other sensors. Specifically, an optical sensor includes an ambient light sensor and a proximity sensor, where the ambient light sensor can adjust the brightness of a display panel 9061 according to the amount of ambient light; and the proximity sensor can turn off the display panel 9061 and/or backlight when the terminal 900 moves to near an ear. As a type of motion sensor, an accelerometer sensor can detect magnitudes of accelerations in various directions (generally three axes) and detect a magnitude and direction of gravity in resting, and can be used for terminal posture recognition (such as switching between landscape and portrait screens, related games, and magnetometer posture calibration) and functions related to vibration recognition (such as pedometer and tapping). The sensor 905 may further include a fingerprint sensor, a pressure sensor, an iris sensor, a molecular sensor, a gyroscope, a barometer, a hygrometer, a thermometer, an infrared sensor, and the like. Details are not further described herein.

The display unit 906 is configured to display information input by a user or information provided to a user. The display unit 906 may include the display panel 9061, and the display panel 9061 may be configured in forms such as a liquid crystal display (LCD) and an organic light-emitting diode (OLED).

The user input unit 907 is configured to receive input digit or character information, and produce a key signal input related to user setting and function control of the terminal. Specifically, the user input unit 907 includes a touch panel 9071 and other input devices 9072. The touch panel 9071, also known as a touch screen, collects touch operations of a user on or near the touch panel (such as an operation on the touch panel 9071 or near the touch panel 9071 of the user using a finger, a stylus or any appropriate object or accessory). The touch panel 9071 may include two parts: a touch detection device and a touch controller. The touch detection device detects a touch position of a user, detects a signal brought by the touch operation, and sends the signal to the touch controller; and the touch controller receives touch information from the touch detection device, coverts the touch information to touch point coordinates, sends the coordinates to the processor 910, and receives and executes a command from the processor 910. In addition, the touch panel 9071 may be implemented in various types, for example, as a resistive, capacitive, infrared, or surface acoustic wave touch panel. In addition to the touch panel 9071, the user input unit 907 may also include other input devices 9072. Specifically, the other input devices 9072 may include but are not limited to a physical keyboard, a function key (such as a volume control key, and an on/off key), a trackball, a mouse device, and a joystick. Details are not further described herein.

Furthermore, the touch panel 9071 may cover the display panel 9061. When detecting a touch operation on or near the touch panel 9071, the touch panel 9071 sends the operation to the processor 910 for determining a type of the touch event, and the processor 910 provides a corresponding visual output on the display panel 9061 based on the type of the touch event. Although in FIG. 9, the touch panel 9071 and the display panel 9061 perform input and output functions of the terminal as two separate components, in some embodiments, the touch panel 9071 and the display panel

9061 can be integrated to perform input and output functions of the terminal. This is not specifically limited herein.

The interface unit 908 is an interface connecting an external apparatus to the terminal 900. For example, the external apparatus may include a wired or wireless headphone port, an external power supply (or battery charger) port, a wired or wireless data port, a storage card port, a port used to connect an apparatus with an identification module, an audio input/output (I/O) port, a video I/O port, an earphone port, and the like. The interface unit 908 may be configured to receive an input (such as data information or electric power) from the external apparatus and transmit the received input to one or more elements in the terminal 900, or be configured to transmit data between the terminal 900 and the external apparatus.

The memory 909 may be configured to store software programs and various data. The memory 909 may mainly include a program storage area and a data storage area, where the program storage area may store an operating system, and application(s) required by at least one function (such as a sound play function and an image play function); and the data storage area may store data (such as audio data and a phone book) created based on use of the mobile phone. In addition, the memory 909 may include a high-speed random access memory, and may further include a non-volatile memory, for example, at least one disk memory device, flash memory device, or other volatile solid-state memory devices.

The processor 910 is a control center of the terminal, which connects parts of the entire terminal by using various ports and lines, and executes various functions of the terminal and processes data by running or executing software programs and/or modules stored in the memory 909, and invoking data stored in the memory 909, thereby performing overall monitoring on the terminal. The processor 910 may include one or more processing units; and the processor 910 may integrate an application processor and a modem processor, where the application processor mainly processes an operating system, a user interface, an application program, and the like; and the modem processor mainly processes wireless communication. It may be understood that the foregoing modem processor may alternatively not be integrated into the processor 910.

The terminal 900 may further include a power supply 911 (such as a battery) supplying power to the components. The power supply 911 may be logically connected to the processor 910 through a power supply management system, thereby performing functions such as charging and discharging management and power management through the power supply management system.

In addition, the terminal 900 includes some function modules that are not displayed, which are not further described herein.

The embodiments of the present disclosure further provide a computer readable storage medium, where the computer readable storage medium stores a computer program, and when the computer program is executed by a processor, the steps of the foregoing message viewing method are implemented with the same technical effects achieved. To avoid repetition, details are not further described herein. The computer readable storage medium is, for example, a read-only memory (ROM), a random access memory (RAM), a magnetic disk or an optical disc.

It should be noted that, in this specification, the terms "include", "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. Without more constraints, an element preceded by "includes a . . . " does not preclude the existence of other identical elements in the process, method, article, or apparatus that includes the element.

Through the above description of embodiments, a person skilled in the art can clearly understand that the method in the embodiments can be implemented by software plus a necessary general hardware platform and certainly, can be implemented by hardware. However, in many cases, the former is a more preferred implementation. Based on this understanding, the essence, or the part contributing to the prior art, of the technical solutions of the present disclosure, can be expressed in a form of a software product. The computer software product is stored in a storage medium (for example, an ROM/RAM, a magnetic disk, or an optical disc), and includes some instructions to cause a terminal (which may be a mobile phone, a computer, a server, an air conditioner, a network device. or the like) to execute the method described in the embodiments of the present disclosure.

The embodiments of the present disclosure are described above with reference to the accompanying drawings, but the present disclosure is not limited to these embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection of the present disclosure.

What is claimed is:

1. A method for viewing unread messages, comprising:
   receiving a first input;
   in response to the first input, displaying a message display screen, wherein:
     the message display screen comprises at least one display window when at least one application of a plurality of applications has an unread message; and
     the message display screen comprises no display windows when the plurality of applications have no unread messages;
   displaying, in the message display screen, at least two display windows in a stacked manner, wherein:
     a first window of the at least two display windows corresponds to a first application of the plurality of applications and is used for displaying only unread messages of the first application; and
     a second window of the at least two windows corresponds to a second application of the plurality of applications and is used for displaying only unread messages of the second application;
   displaying in the first display window at least part of at least one unread message of the first application; and
   displaying in the second display window at least part of at least one unread message of the second application.

2. The method according to claim 1, after displaying the message display screen, further comprising:
   receiving a second input for a first display window, wherein the first display window is one of the at least one display window; and
   in response to the second input, displaying, on the message display screen, a message details screen corresponding to the first display window, wherein the message details screen is used to display, in their entireties, the unread messages of the application corresponding to the first display window.

3. The method according to claim 2, wherein the message details screen is further used to display a read historical message of the application corresponding to the first display window.

4. The method according to claim 1, wherein after displaying the message display screen, the method further comprises:
receiving a third input; and
in response to the third input, switching a second display window displayed at a topmost layer of the message display screen to a third display window, wherein the second display window and the third display window are two different display windows of the at least two display windows.

5. The method according to claim 4, wherein the message display screen further displays an operation control list, and operation controls in the operation control list are in one-to-one correspondence to all display windows currently comprised in the message display screen; and
the third input is an input for an operation control corresponding to the third display window.

6. The method according to claim 1, wherein the unread messages are rendered by using a quick application as a basic render unit and using a message card as a display format, and the quick application is a tap-and-play type application.

7. A terminal, comprising a memory storing a computer program and a processor coupled to the memory and configured to execute the computer program to perform a method for viewing unread messages, the method comprising:
receiving a first input;
in response to the first input, displaying a message display screen, wherein:
the message display screen comprises at least one display window when at least one application of a plurality of applications has an unread message; and
the message display screen comprises no display windows when the plurality of applications have no unread messages;
displaying, in the message display screen, at least two display windows in a stacked manner, wherein:
a first window of the at least two display windows corresponds to a first application of the plurality of applications and is used for displaying only unread messages of the first application; and
a second window of the at least two windows corresponds to a second application of the plurality of applications and is used for displaying only unread messages of the second application;
displaying in the first display window at least part of at least one unread message of the first application; and
displaying in the second display window at least part of at least one unread message of the second application.

8. The terminal according to claim 7, wherein the method, after displaying the message display screen, further comprises:
receiving a second input for a first display window, wherein the first display window is one of the at least one display window; and
in response to the second input, displaying, on the message display screen, a message details screen corresponding to the first display window, wherein the message details screen is used to display, in their entireties, the unread messages of the application corresponding to the first display window.

9. The terminal according to claim 8, wherein the message details screen is further used to display a read historical message of the application corresponding to the first display window.

10. The terminal according to claim 7, windows wherein the method, after displaying the message display screen, further comprises:
receiving a third input; and
in response to the third input, switching a second display window displayed at a topmost layer of the message display screen to a third display window, wherein the second display window and the third display window are two different display windows of the at least two display windows.

11. The terminal according to claim 10, wherein the message display screen further displays an operation control list, and operation controls in the operation control list are in one-to-one correspondence to all display windows currently comprised in the message display screen; and
the third input is an input for an operation control corresponding to the third display window.

12. The terminal according to claim 7, wherein the unread messages are rendered by using a quick application as a basic render unit and using a message card as a display format, and the quick application is a tap-and-play type application.

13. A non-transitory computer readable storage medium, storing a computer program, when the computer program is executed by a processor, performs a method for viewing unread messages, the method comprising:
receiving a first input;
in response to the first input, displaying a message display screen, wherein:
the message display screen comprises at least one display window when at least one application of a plurality of applications has an unread message; and
the message display screen comprises no display windows when the plurality of applications have no unread messages;
displaying, in the message display screen, at least two display windows in a stacked manner, wherein:
a first window of the at least two display windows corresponds to a first application of the plurality of applications and is used for displaying only unread messages of the first application; and
a second window of the at least two windows corresponds to a second application of the plurality of applications and is used for displaying only unread messages of the second application;
displaying in the first display window at least part of at least one unread message of the first application; and
displaying in the second display window at least part of at least one unread message of the second application.

14. The non-transitory computer readable storage medium according to claim 13, wherein the method, after displaying the message display screen, further comprises:
receiving a second input for a first display window, wherein the first display window is one of the at least one display window; and
in response to the second input, displaying, on the message display screen, a message details screen corresponding to the first display window, wherein the message details screen is used to display, in their entireties, the unread messages of the application corresponding to the first display window.

15. The non-transitory computer readable storage medium according to claim 14, wherein the message details screen is further used to display a read historical message of the application corresponding to the first display window.

16. The non-transitory computer readable storage medium according to claim 13, wherein the method, after displaying the message display screen, further comprises:
   receiving a third input; and
   in response to the third input, switching a second display window displayed at a topmost layer of the message display screen to a third display window, wherein the second display window and the third display window are two different display windows of the at least two display windows.

17. The non-transitory computer readable storage medium according to claim 16, wherein the message display screen further displays an operation control list, and operation controls in the operation control list are in one-to-one correspondence to all display windows currently comprised in the message display screen; and
   the third input is an input for an operation control corresponding to the third display window.

18. The non-transitory computer readable storage medium according to claim 13, wherein the unread messages are rendered by using a quick application as a basic render unit and using a message card as a display format, and the quick application is a tap-and-play type application.

* * * * *